US011993980B2

(12) United States Patent
Errington

(10) Patent No.: US 11,993,980 B2
(45) Date of Patent: May 28, 2024

(54) CLOSURE SYSTEM

(71) Applicant: CornellCookson, LLC, Mountain Top, PA (US)

(72) Inventor: Trevor Errington, Danielsville, PA (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

(21) Appl. No.: 17/045,048

(22) PCT Filed: Apr. 4, 2018

(86) PCT No.: PCT/US2018/026064
§ 371 (c)(1),
(2) Date: Oct. 2, 2020

(87) PCT Pub. No.: WO2019/194801
PCT Pub. Date: Oct. 10, 2019

(65) Prior Publication Data
US 2021/0148163 A1 May 20, 2021

(51) Int. Cl.
*E06B 9/15* (2006.01)
*E06B 9/58* (2006.01)
*E06B 9/86* (2006.01)

(52) U.S. Cl.
CPC ................ *E06B 9/15* (2013.01); *E06B 9/581* (2013.01); *E06B 9/86* (2013.01);
(Continued)

(58) Field of Classification Search
CPC ............... E06B 9/15; E06B 2009/1505; E06B 2009/1533; E06B 2009/1538; E06B 9/581;
(Continued)

(56) References Cited

U.S. PATENT DOCUMENTS 3,633,647 A * 1/1972 Leitgeb .................. E06B 9/165
160/220
4,979,553 A * 12/1990 Lowry, III ............. E06B 3/485
160/133
(Continued)

FOREIGN PATENT DOCUMENTS

CN 206530247 9/2017
WO 2010007536 A1 1/2010

OTHER PUBLICATIONS

International Search Report and Written Opinion for International Patent Application No. PCT/US2018/026064, 9 pages.
(Continued)

*Primary Examiner* — Daniel P Cahn
*Assistant Examiner* — Matthew R. Shepherd

(57) ABSTRACT

In one embodiment, a closure system comprises a guide assembly having a channel defined by a first guide wall and a second guide wall. The closure system may include a retention bar extending into the channel from the first guide wall and a plurality of slats. Each slat of the plurality of slats may be configured to interlock with another of the plurality of slats. Each slat may have a retention groove with at least one sidewall configured and dimensioned to engage the retention bar to retain the slat within the channel.

30 Claims, 15 Drawing Sheets

(52) U.S. Cl.
CPC ................. *E06B 2009/1516* (2013.01); *E06B 2009/1522* (2013.01); *E06B 2009/1544* (2013.01)

(58) Field of Classification Search
CPC ............... E06B 9/86; E06B 2009/1516; E06B 2009/1522; E06B 2009/1544; E06B 9/11
See application file for complete search history.

(56) References Cited

U.S. PATENT DOCUMENTS

| | | | | |
|---|---|---|---|---|
| 5,515,902 | A * | 5/1996 | Hoffman ................. | E06B 9/165 160/235 |
| 5,839,493 | A | 11/1998 | Quasius | |
| 6,068,040 | A | 5/2000 | Magro et al. | |
| 6,834,468 | B1 * | 12/2004 | Kroie .................... | E04B 1/6141 52/590.2 |
| 2003/0041978 | A1 * | 3/2003 | Farooq .................... | E06B 9/581 160/133 |
| 2015/0191969 | A1 | 7/2015 | Allen | |
| 2015/0292262 | A1 * | 10/2015 | Miller ....................... | E06B 9/13 160/270 |
| 2015/0322711 | A1 | 11/2015 | Rowley et al. | |
| 2016/0230444 | A1 | 8/2016 | Hahn et al. | |

OTHER PUBLICATIONS

Brazilian Office Action mailed in corresponding Brazilian Application No. BR112020020327-0 dated Nov. 29, 2022, 6 pages.

* cited by examiner

CLOSURE SYSTEM

CROSS REFERENCE TO RELATED APPLICATIONS

This application is a U.S. National Phase of International Application No. PCT/US2018/026064 filed on Apr. 4, 2018, entitled "Closure System", which is incorporated by reference herein in its entirety.

BACKGROUND OF THE INVENTION

The present invention generally relates to a closure for an opening and, more particularly, to a closure system.

Conventional closure systems prevent unwanted persons or objects from traversing through an opening. Such closures are usually movable between an extended state where the closure occludes the opening and a retracted state where the closure occludes the opening by a lesser amount. The closures may be designed to withstand external forces such as a wind load or prying. Thus, a need exists for a closure system that can withstand greater forces and remain operable.

BRIEF SUMMARY OF THE INVENTION

In one embodiment, a closure system comprises a guide assembly having a channel defined by a first guide wall and a second guide wall. The closure system may include a retention bar extending into the channel from the first guide wall and a plurality of slats. Each slat of the plurality of slats may be configured to interlock with another of the plurality of slats. Each slat may have a retention groove with at least one sidewall configured and dimensioned to engage the retention bar to retain the slat within the channel. The retention groove may include two sidewalls, with each sidewall configured and dimensioned to engage the retention bar to retain the slat within the channel. The closure system may further comprise a plurality of beads, each bead of the plurality of beads comprising an interlocking of adjacent slats. Each bead may have an outermost face and each slat having a major slat width from an innermost face of the slat to the outermost face of the bead. Each sidewall may be substantially perpendicular to the outermost face of the slat, the at least one sidewall extending into the slat from the innermost face of the slat a distance that may be one-third of the major slat width. All of the plurality of slats may interlock at one or more of the plurality of beads. The guide assembly may comprise a first guide component that may include the first guide wall and a first web, and a second guide component that may include the second guide wall and a second web. The first web and the second web may be coupled to form the channel. The retention bar may have a bar width measured along a longitudinal axis of the slat and the retention grove may have a groove width measured along the longitudinal axis of the slat and wherein a ratio of groove width to bar width may be about 2.5:1. The retention groove may have a groove width measured along the longitudinal axis of the slat and the retention groove may be positioned at a distance from a terminal end of the slat of at least about 0.8 times the groove width. Each of the plurality of slats may be joined together in a rectangular interlocking grip. Each of the plurality of slats may comprise a major rectangular hook and a minor rectangular hook that are each configured and dimensions such that, in use, the minor rectangular hook of a first slat may be disposed within the major rectangular hook of an adjoining slat. At least one of the plurality of slats may have a moment of inertia in a first direction of at least 0.1 $inches^4$.

Each of the plurality of slats may have a slat body disposed between the major rectangular hook and the minor rectangular hook. The slat body may be disposed lower than a lowest portion of the major rectangular hook. The major rectangular hook may comprise a major first segment disposed substantially perpendicular to the slat body. The minor rectangular hook may comprise a minor first segment substantially perpendicular to the slat body. The minor first segment of the first slat may bear against the major first segment of the adjoining slat when the closure system is in a closed position. When the closure system is in a closed position each pair of adjoining slats may comprise an upper slat that bears upon a lower slat.

In a further embodiment a damper may be coupled to at least one major rectangular hook or minor rectangular hook. The major rectangular hook may include a major first segment having a longitudinal axis that may be substantially perpendicular to the longitudinal axis of the slat body. The major rectangular hook may include a major second segment adjacent the major first segment, the major second segment may have a longitudinal axis that may be substantially parallel to the longitudinal axis of the slat body. A major third segment may be adjacent the major second segment, the major third segment having a longitudinal axis that may be substantially parallel to the longitudinal axis of the major first segment. A major fourth segment may be adjacent the major third segment, the major fourth segment having a longitudinal axis that may be substantially parallel to the longitudinal axis of the major second segment.

The minor rectangular hook may include a minor first segment having a longitudinal axis that may be substantially perpendicular to the longitudinal axis of the slat body. A minor second segment may be adjacent the minor first segment, the minor second segment having a longitudinal axis that may be substantially parallel to the longitudinal axis of the slat body. A minor third segment may be adjacent the minor second segment, the minor third segment having a longitudinal axis that may be substantially parallel to the longitudinal axis of the minor first segment. When the closure system is in the closed position the minor rectangular hook of the first slat may nest in the major rectangular hook of the adjoining slat such that the major first segment may be adjacent the minor first segment, the major second segment may be adjacent the minor second segment and the major third segment may be adjacent the minor third segment. The retention groove may extend into a portion of at least one of the major rectangular hook and the minor rectangular hook of each of the plurality of slats. The retention groove on each of the plurality of slats may be disposed within the slat body. The major rectangular hook may comprise a major width defined by an outermost face of an outward vertical segment and an innermost face of a terminal vertical segment and, when the plurality of slats are within the channel, the retention bar may extend across at least 25% of the major width. Each of the plurality of slats may be moveable relative to the retention bar in a direction transverse to a longitudinal axis of retention bar such that the retention bar extends across at least 25% of the major width and no more than 55% of the major width. Each of the plurality of slats may have a slat width X extending from a back face of the slat body to a front face of the major rectangular hook, the first guide wall and the second guide wall may be separated by a distance Y, and X may be approximately 1.04 to 1.3 times greater than Y.

The closure system may include a bottom slat that may be configured to resist prying. At least a portion of the bottom slat may be tensioned when exposed to upward prying. The bottom slat may bear the weight of a majority of the plurality of slats. The closure system may include a means for applying a compression force at a top of the closure system that translates to the bottom slat. The closure system may be configured to permanently deform a maximum of three inches in a direction substantially normal to an inner most surface when a fifteen pound two by four at a speed of 100 miles per hour impacts the closure system. The closure system may be configured to withstand perforation when the two by four impacts the closure system at a speed of 100 miles per hour as performed in accordance with ICC 500-2014. The closure system may be configured to have a maximum perforation of 5 inches by 1⁄16 inches when the two by four impacts the closure system at a speed of 80 feet per second as performed in accordance with ASTM E1996-14. The closure system may be configured to withstand positive or negative pressure of 300 pounds per square foot on one side of the closure system. The closure system may be configured to withstand positive or negative pressure of 90 pounds per square foot on one side of the closure system.

The bottom bar may include a channel member nested within a minor rectangular hook. The closure system may be configured to comply with at least one of FEMA P-361, Third edition. The minor hook may be configured to deform prior to deformation of a body of the slat. The plurality of slats may be configured to deform internally before deforming externally. Deformation of one of the plurality of slats may be localized. The plurality of slats may be configured to reduce curtain deformation from a concentrated load.

BRIEF DESCRIPTION OF THE SEVERAL VIEWS OF THE DRAWINGS

The foregoing summary, as well as the following detailed description of embodiments of the closure system, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE INVENTION

Figure 1:
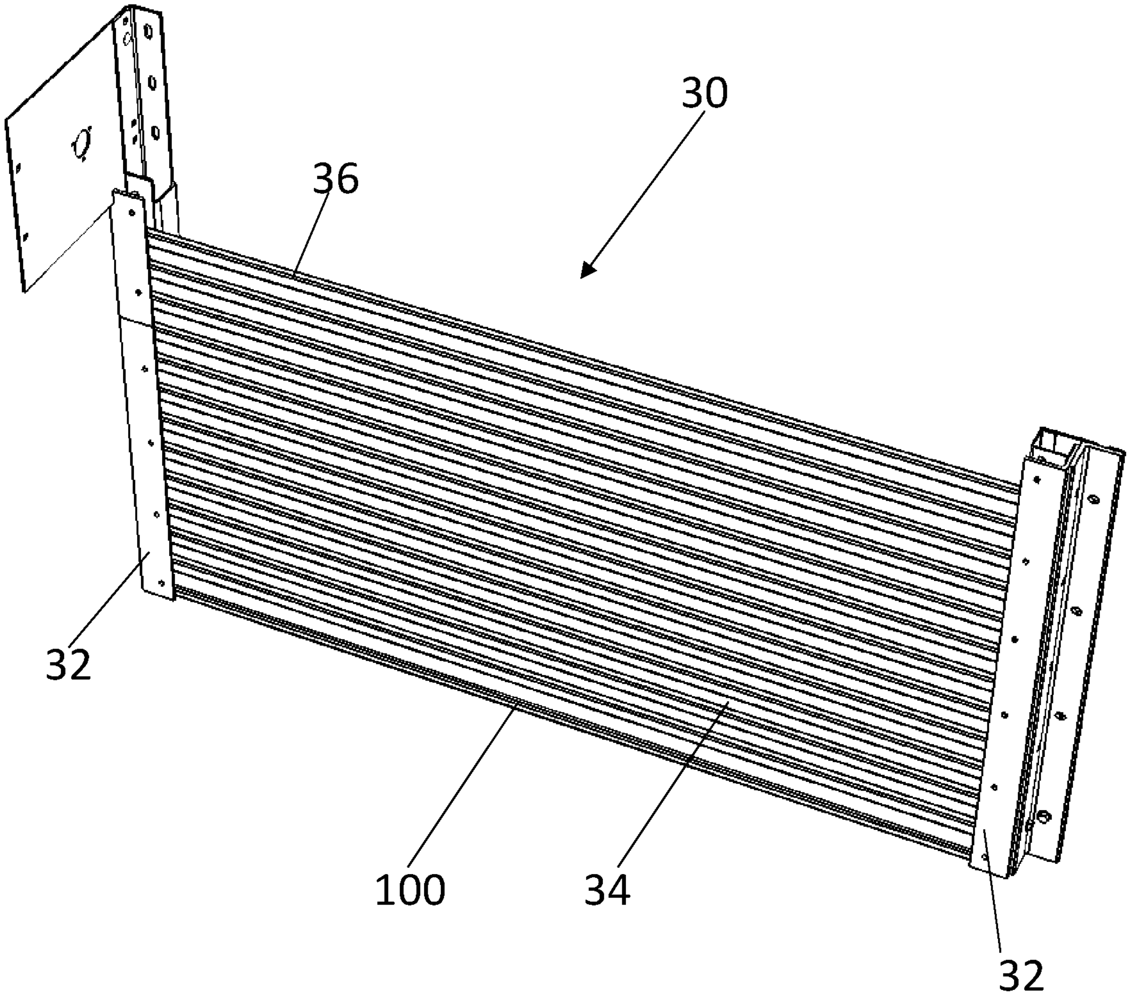
FIG. 1 is a top perspective view of a closure system in accordance with an exemplary embodiment of the present invention.

Referring to the drawings in detail, wherein like reference numerals indicate like elements throughout, there is shown in FIGS. 1-15 a closure system, generally designated 30, in accordance with an exemplary embodiment of the present invention.

In some embodiments, the closure system 30 is configured to obscure an opening (e.g., a doorway, a window, or opening in a wall). In some embodiments, the closure system 30 is configured to selectively obstruct or allow passage through the opening. In some embodiments, the closure system 30 comprises a guide assembly 32 adjacent (e.g., fixed to) one or more edges of the opening, as explained in greater detail below. In some embodiments, the closure system 30 includes a curtain 34 movably coupled to the guide assembly 32 such that the curtain 34 selectively moves relative to the guide assembly 32 between a closed position wherein the opening is obscured as shown, for example, in FIG. 1, and an open position wherein the opening is unobstructed by the curtain 34 as shown, for example, in FIG. 15.

Referring to FIGS. 1-4, in some embodiments the curtain 34 includes a plurality of slats 36 configured to be coupled to (e.g., interlocked with) each other to form the curtain 34. In some embodiments, adjacent slats 36 are configured to be moveable (e.g., rotatable, pivotable, hinged or slideable) relative to each other such that the curtain 34 can be coiled about itself or about an axle. In some embodiments, the curtain 34 is fixed to an axle and the closure system 30 includes an actuator (e.g., a motor, a lever, or a hand crank) configured to rotate the axle to move the curtain 34 between the open position and the closed position. In some embodiments, the curtain 34 is a coiling curtain. In some embodiments, the slats 36 include a solid or substantially solid surface such that the slats 36 prevent or substantially prevent the passage of at least one of air, light, debris or objects through the opening when the curtain 34 is in the closed position. In some embodiments, the slats 36 include one or more perforations and the closure system 32 includes a grate. In one embodiment, the slat includes one or more 12-gauge metal plates. In one embodiment, the slats include metal plates of a larger or smaller gauge. In one embodiment, the slat includes a metal plate having bent major and minor hooks.

Figure 4:
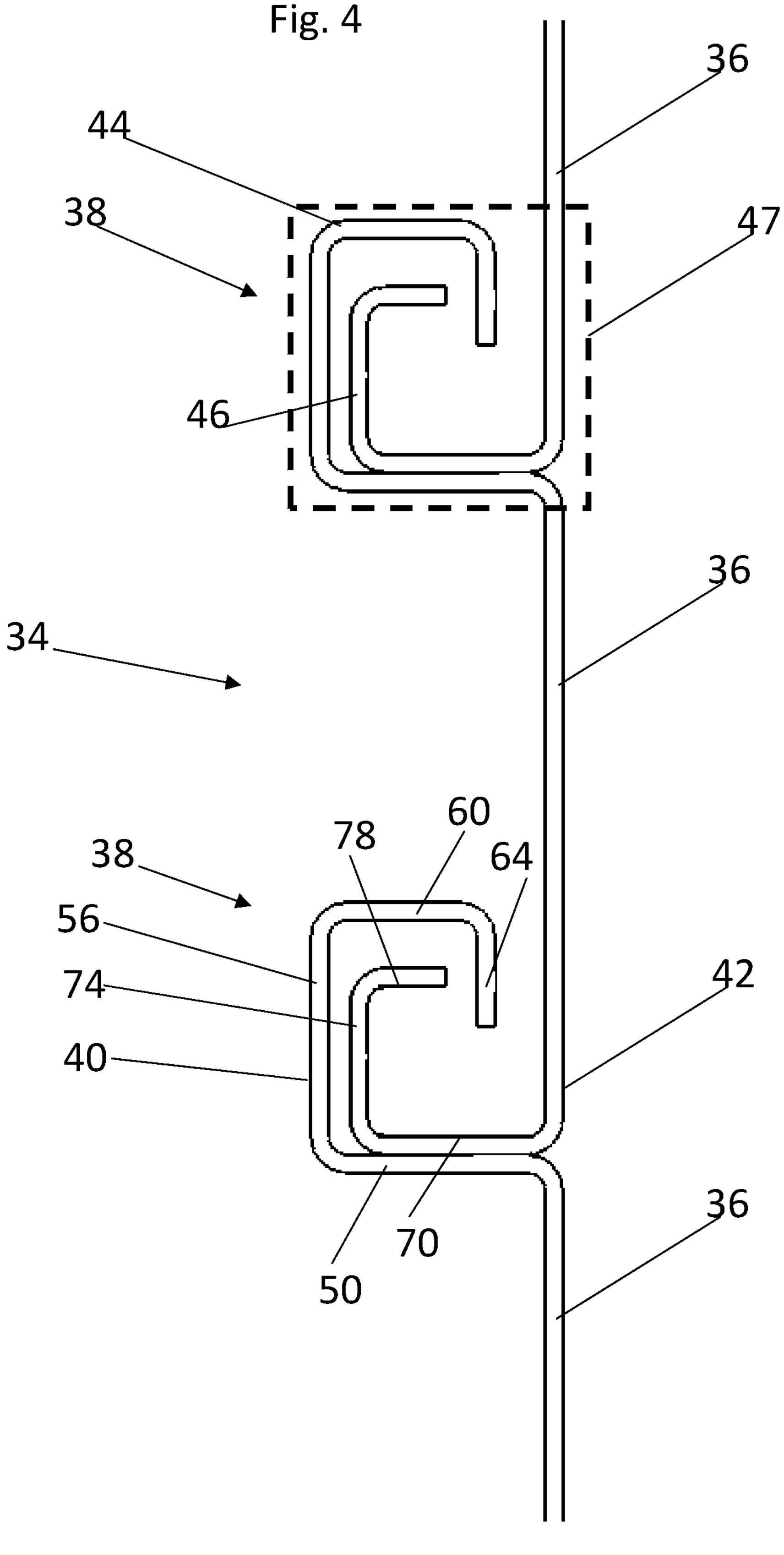
FIG. 4 a side view of interlocking slats of the closure system of FIG. 1.

In some embodiments, the curtain 34 includes a plurality of beads 38 (FIG. 4). In some embodiments, beads 38 are configured to join adjacent slats to one another. In some embodiments, the beads are configured to resist deformation (e.g., to resist any substantial deformation, or to resist a predetermined amount of deformation) of the curtain 34 when a force is applied thereto. In some embodiments, each bead 38 comprises an interlocking of adjacent slats 36. In some embodiments, a slat 36 that includes a bead 38 is up to about 75,000% stronger than a curtain that does not include a bead.

The strength of the curtain may be determined by calculating the moment of inertia in the X and Y directions. The moment of inertia in the X direction may indicate the curtain's resistance to bending when a force is applied as if a wind load or horizontal force was applied to push the curtain into the opening. In one embodiment, a slat 36 (e.g., a 4 inch high slat of 12-gauge metal) that includes a bead 38 has a moment of inertia in the X direction of about 0.285 inches$^4$. In one embodiment a plate (e.g., a 4 inch tall plate of 12-gauge metal) has a moment of inertia in the X direction of about 0.000381 inches$^4$. In one embodiment, a moment of inertia in the X direction of a slat 36 that includes a bead 38 is up to about 75,000% greater than the moment of inertia in the X direction of a plate. In some embodiments, the calculations for the moment of inertia for the slat 36 that includes a bead 38 and the moment of inertia for the plate are performed assuming that the slat 36 and the plate have the same height, length, and are of the same gauge metal. The moment of inertia in the Y direction may indicate the curtain's resistance to bending when a force is applied as if someone were prying on the curtain up. In one embodiment, a slat 36 (e.g., a 4 inch high slat of 12-gauge metal) that includes a bead 38 has a moment of inertia in the X direction of about 4.005 inches$^4$. In one embodiment a plate (e.g., a 4 inch high plate of 12-gauge metal) has a moment of inertia in the X direction of about 0.557 inches$^4$. In one embodiment, a moment of inertia in the Y direction of a slat 36 that includes a bead 38 is up to about 725% greater than the moment of inertia in the Y direction of a plate. In some embodiments, the moment of inertia in the X and Y directions may be indicative of the moment of inertia of one interlocked slat of the curtain.

In some embodiments, the slats 36 interlock with one or more adjacent slats 36 at one or more of the plurality of beads 38 (e.g., one slat may interlock at a bead with each of two adjacent slats). In some embodiments, the portion of a slat 36 that contributes to a bead is about 50% to about 70%, about 55% to about 75%, about 55%, about 60%, about 65%, about 70%, or about 75% of the mass of the slat 36. In some embodiments, each bead 38 includes an outermost face 40 and an innermost face 42 (FIG. 4). In some embodiments, the center of mass of the slat 36 is closer to the outermost face 40 than the innermost face 42. In some embodiments, the slat 36 has a major slat width from the innermost face 42 of the slat 36 to the outermost face 40 of the bead 38.

In some embodiments, adjacent slats 36 are coupled to each other at an interlocking grip (e.g., bead 38). In some embodiments, the interlocking grip is a rectangular interlocking grip. In other embodiments, the interlocking grip is circular, triangular, pentagonal, hexagonal, heptagonal, or octagonal. In some embodiments, the interlocking grip includes nested elements of adjacent slats that rotatably couple the slats to each other. In some embodiments, the interlocking grip prevents the slats 36 from twisting or rotating relative to an adjacent slat within the guide when a force (e.g., an upward force) is applied to the slats 36.

In some embodiments, each pair of adjoining slats 36 comprises an upper slat that bears upon a lower slat when the curtain 34 is in the closed position. In one embodiment, adjoining slats 36 are configured to resist pivoting in the guides. As illustrated in FIG. 4, for example, the weight of a top slat may propagate to each slat below the top slat. The propagation of weight downward may result from the geometry of the bead and/or the relationship and shape of major and minor bead components. Beads 38 may for example have a shape (e.g., a rectangular shape) with flat and/or horizontal faces of major and minor components that act as bearing surfaces when the closure is in closed position. In one embodiment, flat parallel surfaces are configured to promote the resistance of pivoting in the guides. One benefit of such a configuration is an enhanced resistance to displacing the position of the closure. Another benefit may be the resistance of the bottom slat to be being pried or moved upward. On one embodiment, the closure comprises a plurality of slats that each have a substantially identical geometry. In one embodiment, such a configuration may allow a slat to be positioned at multiple positions in the closure.

Figure 2:
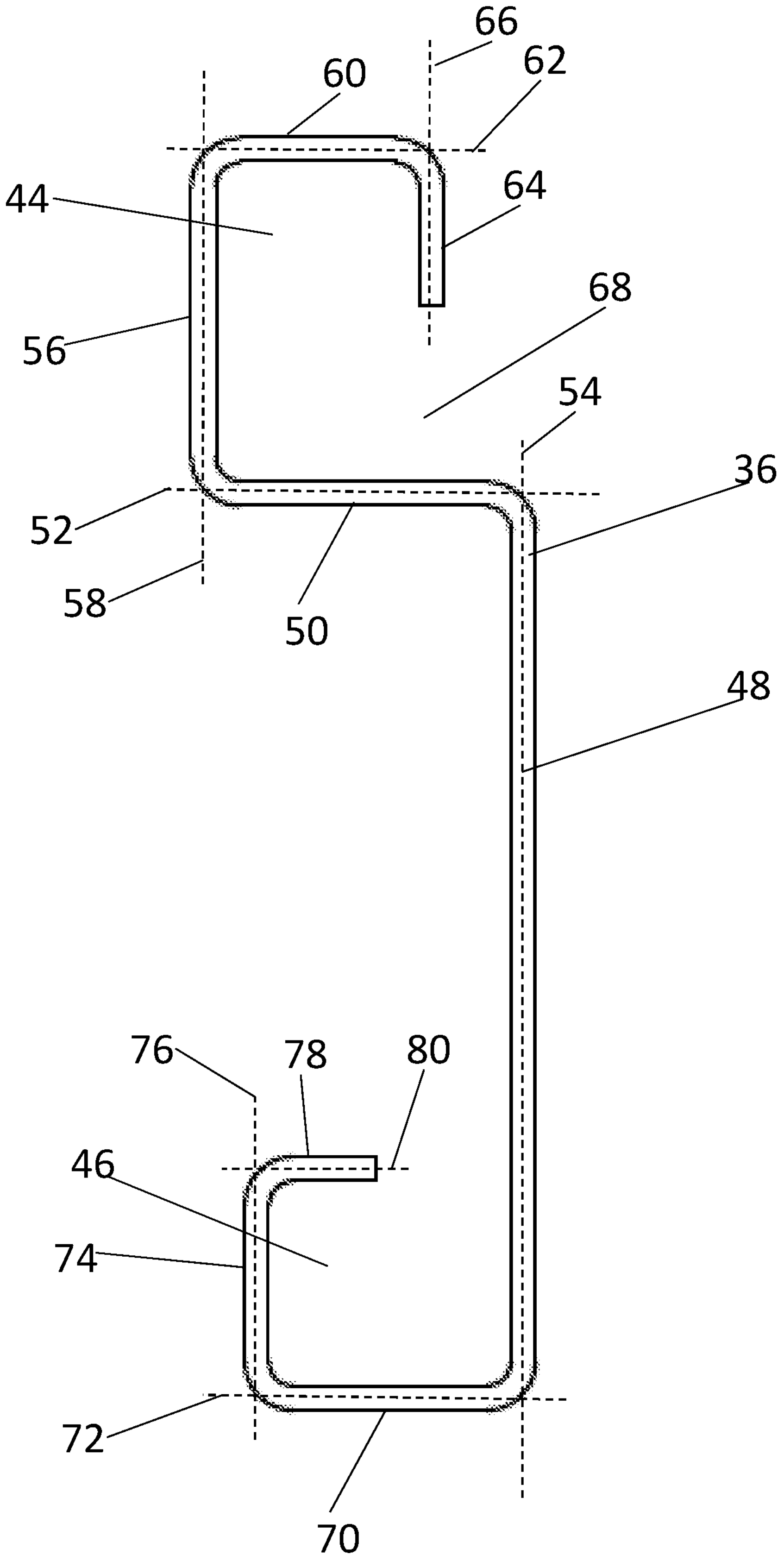
FIG. 2 is a side view of a slat of the closure system of FIG. 1.

Referring to FIG. 2, in some embodiments, the slat 36 includes a body 48, a major hook 44 (e.g., a major rectangular hook), and a minor hook 46 (e.g., a minor rectangular hook). In some embodiments, the major hook 44, the minor hook 46, and the body 48 are a monolithic construct. In some embodiments, at least one of the major hook 44 and the minor hook 46 are coupled to the body 48 (e.g., via adhesive, welding, rivet, or threaded fastener). In some embodiments, the body 48 is disposed between the major hook 44 and the minor hook 46. In some embodiments, the major hook 44 is configured and dimensioned such that in use, the minor hook 46 of one slat 36 is disposed within the major hook 44 of an adjoining slat (FIG. 4). In some embodiments, the body 48 is disposed lower than a lowest portion of the major hook 44. In some embodiments, the curtain 34 is assembled by longitudinally sliding a lower slat relative to an adjacent slat such that the major hook 44 receives the minor hook 46.

In some embodiments, the major hook 44 includes a major first segment 50 as shown in FIG. 2. In some embodiments, the major first segment 50 is adjacent (e.g., directly coupled) to the body 48. In some embodiments, the major first segment 50 is transverse to the body 48. In some embodiments, the major first segment 50 is substantially perpendicular to the body 48. In some embodiments, the major first segment 50 has a longitudinal axis 52 that is substantially perpendicular to a longitudinal axis 54 of the body 48.

In some embodiments, the major hook 44 includes a major second segment 56. In some embodiments, the major second segment 56 is adjacent (e.g., directly coupled to) the major first segment 50. In some embodiments, the major second segment 56 includes a longitudinal axis 58 that is substantially parallel to the longitudinal axis 54 of the body 48. In some embodiments, the longitudinal axis 58 is transverse to the longitudinal axis 52 of the major first segment 50. In some embodiments, the longitudinal axis 58 is substantially perpendicular to the longitudinal axis 52 of the major first segment 50.

In some embodiments, the major hook 44 includes a major third segment 60. In some embodiments, the major third segment 60 is adjacent (e.g., directly coupled to) the major second segment 56. In some embodiments, the major third segment 60 includes a longitudinal axis 62 that is substantially parallel to the longitudinal axis 52 of the major first segment 50. In some embodiments, the longitudinal axis 62 is transverse to the longitudinal axis 58 of the major second segment 58. In some embodiments, the longitudinal axis 62 is substantially perpendicular to the longitudinal axis 58 of the major second segment 58.

In some embodiments, the major hook 44 includes a major terminal segment or a major fourth segment 64. In some embodiments, the major fourth segment 64 is adjacent (e.g., directly coupled to) the major third segment 60. In some embodiments, the major fourth segment 64 includes a longitudinal axis 66 that is substantially parallel to the longitudinal axis 58 of the major second segment 56. In some embodiments, the longitudinal axis 66 is transverse to the longitudinal axis 62 of the major third segment 60. In some embodiments, the longitudinal axis 66 is substantially perpendicular to the longitudinal axis 62 of the major third segment 60.

In some embodiments, the major fourth segment 64 as measured along longitudinal axis 66 is shorter than the major second segment 56 as measured along longitudinal axis 58 such that an opening 68 is disposed between a free end of the major fourth segment 64 and the major first segment 50. In some embodiments, the length of the opening 68 may be selected to control the relative rotation between adjacent slats 36. For example, a longer opening 68 may allow a greater range of rotation while a shorter opening 68 may limit the range of rotation. In some embodiments, a ratio of the length of the major second segment 56 to the length of the major fourth segment 64 is about 1.5:1, about 2:1, about 3:1, about 4:1, or about 5:1. In some embodiments, the major third segment 60 includes a different length (i.e., longer or shorter) than the major first segment 50 such that the longitudinal axis 66 of the major fourth segment 64 is offset from the longitudinal axis 54 of the body 48.

In some embodiments, the minor hook 46 includes a minor first segment 70 as shown in FIG. 2. In some embodiments, the minor first segment 70 is adjacent (e.g., coupled) to the body 48. In some embodiments, the minor first segment 70 is transverse to the body 48. In some embodiments, the minor first segment 70 is substantially perpendicular to the body 48. In some embodiments, the minor first segment 70 has a longitudinal axis 72 that is substantially perpendicular to a longitudinal axis 54 of the body 48.

In some embodiments, the minor hook 46 includes a minor second segment 74. In some embodiments, the minor second segment 74 is adjacent (e.g., coupled to) the minor first segment 70. In some embodiments, the minor second segment 74 includes a longitudinal axis 76 that is substantially parallel to the longitudinal axis 54 of the body 48. In some embodiments, the longitudinal axis 76 is transverse to the longitudinal axis 72 of the minor first segment 70. In some embodiments, the longitudinal axis 76 is substantially perpendicular to the longitudinal axis 72 of the minor first segment 70.

In some embodiments, the minor hook 46 includes a terminal segment or a minor third segment 78. In some embodiments, the minor third segment 78 is adjacent (e.g., coupled to) the minor second segment 74. In some embodiments, the minor third segment 78 includes a longitudinal axis 80 that is substantially parallel to the longitudinal axis 72 of the minor first segment 70. In some embodiments, the longitudinal axis 80 is transverse to the longitudinal axis 76 of the minor second segment 74. In some embodiments, the longitudinal axis 80 is substantially perpendicular to the longitudinal axis 76 of the minor second segment 74.

In some embodiments, the minor hook 46 of a first slat 36 nests in the major hook 44 of an adjoining slat 36 such that the major first segment 50 is adjacent the minor first segment 70, the major second segment 56 is adjacent the minor second segment 74, and the major third segment 60 is adjacent the minor third segment 78 when the curtain 34 is in the closed position. In one embodiment, adjacent segments of major and minor hooks are not in engagement with each other but are configured to engage each other when the curtain moves. One benefit of such a geometry is that an amount of movement of adjacent slats relative to each other can be accommodated. In some embodiments, the curtain 34 is designed to deform internally (e.g., the minor hook within the major hook of an adjacent slat) before deforming externally. In some embodiments, the major hooks or minor hooks are designed and dimensioned to deform such that the major and minor hooks absorb energy (e.g., from an impact or an externally applied force) by deforming prior to deformation of a majority of the curtain. In some embodiments, the minor hook deforms by moving toward or away from the slat body. In some embodiments, one nested pair of the major and minor hooks deform before another nested pair of the major and minor hooks deforms such that deformation of the slats is localized. In some embodiments, the minor hook may have more clearance within the major hook than existing interlocking slat designs such that the minor hook can deform within the major hook before deformation is observable on the surface of the curtain. In some embodiments, a minor hook within a larger major hook allows absorption of energy (e.g., from an impact or an external force) without an impact on the curtain (e.g., the appearance or structural integrity of the curtain). In some embodiments, the impact may be from a 2×4 piece of lumber with a velocity of 100 miles per hour and the curtain may deform less than 3 inches. In some embodiments, the external force is a concentrated load applied to one or more slats and the slats are designed and dimensioned to deform internally to reduce overall curtain deformation. In one embodiment, the area of hook material (e.g., major and minor hook material) within a bead relative to the area of the bead as defined by the outer surface wall of the major hook and the outer face of body 48 (illustrated in FIG. 4 as area 47) is about 20%, about 25%, about 30%, about 35%, about 40%, about 45%, about 50%, or about 55%. In one embodiment, the gap between major hook 44 and minor hook 46 within the bead is minimized to provide a more compact curtain compared to a curtain with a larger gap between major hook 44 and minor hook 46.

In one embodiment, the portion of the total length of slat that contributes to bead 38 is about 40% to about 80%, about 50% to about 70%, about 40%, about 50%, about 60%, about 70%, or about 80% of the total slat length 98. In one embodiment, the portion of total length of slat that contributes to bead 38 is the portion of the slat that comprises the major hook and the minor hook and/or the portion that that does not make up the slat body 48. One benefit to a larger portion of slat length being taken up by the bead is increased strength and resistance to deformation.

In some embodiments, the longitudinal axis 72 of the minor first segment 70 is parallel to the longitudinal axis 52 of the major first segment 50 when the closure is closed. In some embodiments, the longitudinal axis 78 of the minor second segment 74 is parallel to the longitudinal axis 58 of the major second segment 56 when the closure is closed. In some embodiments, the longitudinal axis 80 of the minor third segment 78 is parallel to the longitudinal axis 62 of the major third segment 60 when the closure is closed.

Figure 3:
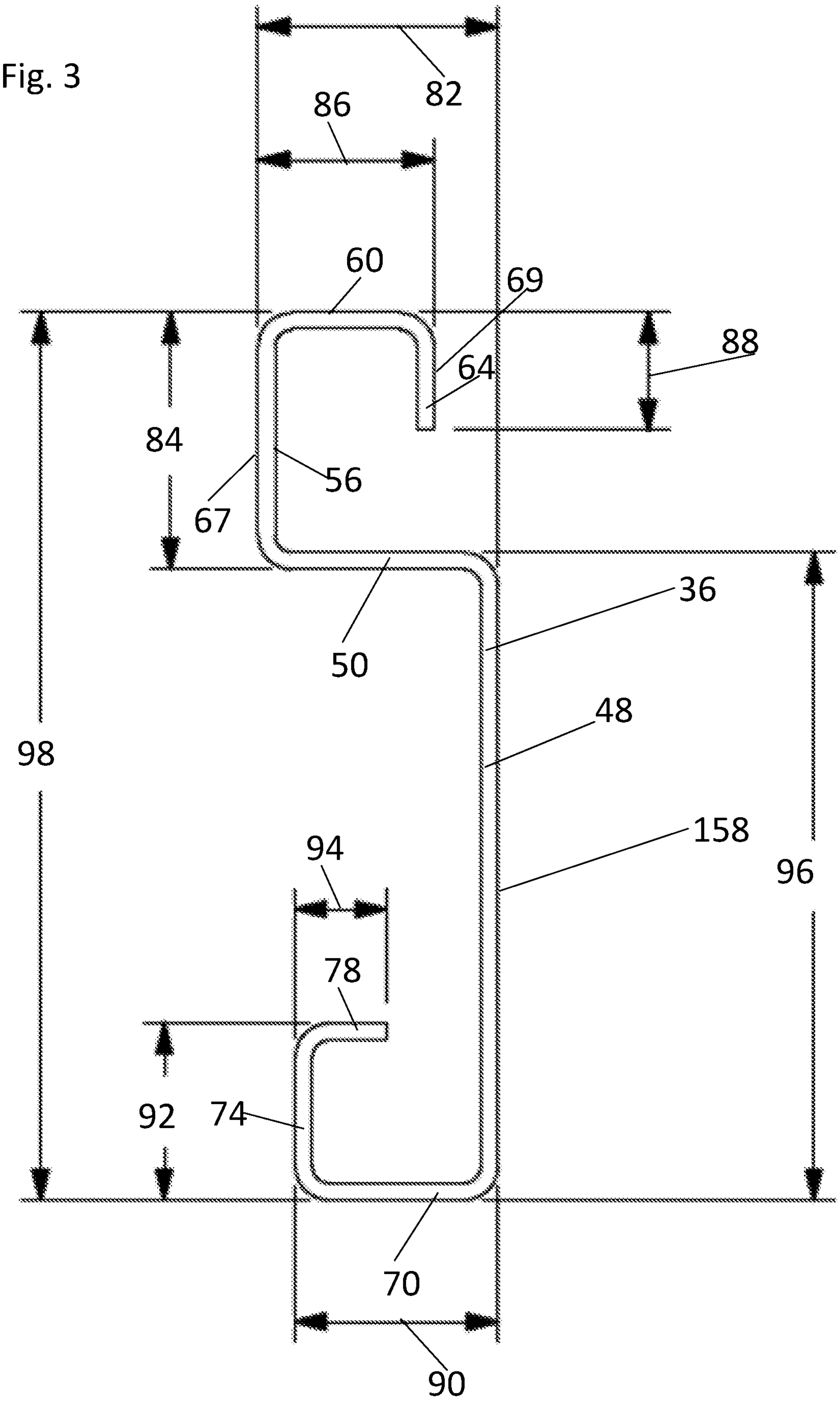
FIG. 3 is a side view of a slat of the closure system of FIG. 1.

Referring to FIG. 3, in some embodiments, the major first segment 50 has a length 82 of about 1 inch to about 2 inches, about 1 inch, about 1.375 inches, about 2 inches, about 1.75 inches or about 1.5 inches. In some embodiments, the major second segment 56 has a length 84 of about 1 inch to about 2 inches, or about 1.5 inches. In some embodiments, the major third segment 60 has a length 86 of about 0.75 inches to about 1.25 inches, or about 1.1 inches. In some embodiments, the major fourth segment 64 has a length 88 of about 0.5 inches to about 1 inch, or about 0.75 inches. In some embodiments, the minor first segment 70 has a length 90 of about 0.75 inches to about 1.75 inches, or about 1.25 inches. In some embodiments, the minor second segment 74 has a length 92 of about 0.75 inches to about 1.25 inches, or about 1.1 inches. In some embodiments, the minor third segment 78 has a length 94 of about 0.25 inches to about 1 inch, or about 0.5 inches. In some embodiments, the body 48 has a length 96 of about 2 inches to about 6 inches, about 3 inches to about 5 inches, or about 4 inches. In some embodiments, the slat 36 has a total length 98 of about 3 inches to about 8 inches, about 4 inches to about 7 inches, about 5 inches to about 6 inches, or about 5.5 inches.

In some embodiments, length 82 may be greater than length 86. In some embodiments, length 82 may be greater than length 84. In some embodiments, length 86 may be less than length 86. In some embodiments, length 88 may be less than length 88. In some embodiments, length 90 may be less than length 82. In some embodiments, length 86 may be less than length 90. In some embodiments, length 92 may be less than length 90. In some embodiments, length 94 may be less than length 92. In some embodiments, length 96 may be less than length 98. In some embodiments, length 96 may be greater than length 92 and length 84 combined. In some embodiments, length 84 may be greater than length 86 and length 88 combined. In some embodiments, length 90 may be greater than length 92 and length 94 combined.

Figure 5:
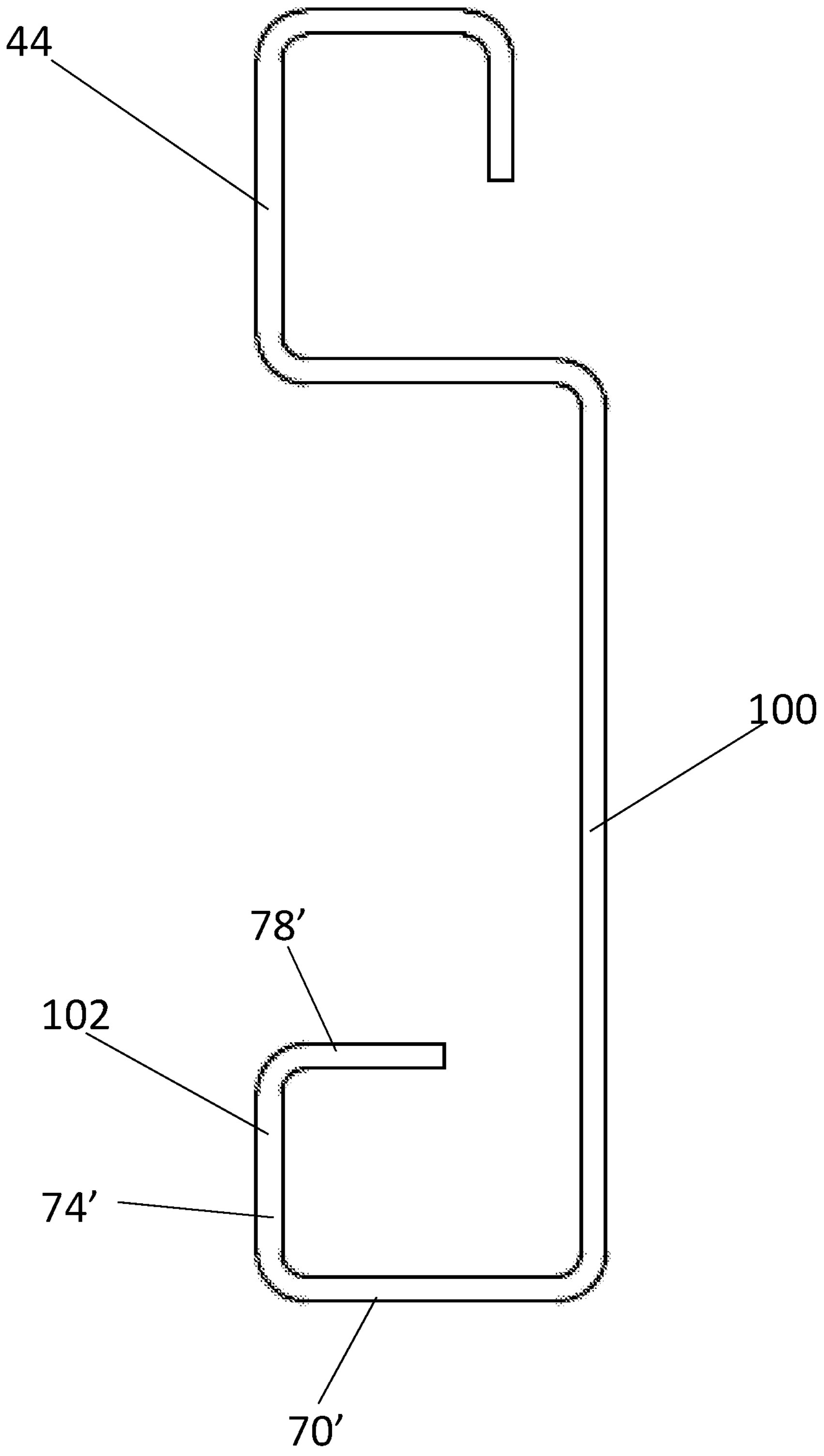
FIG. 5. is a side view of a bottom slat of the closure system of FIG. 1.
Figure 6:
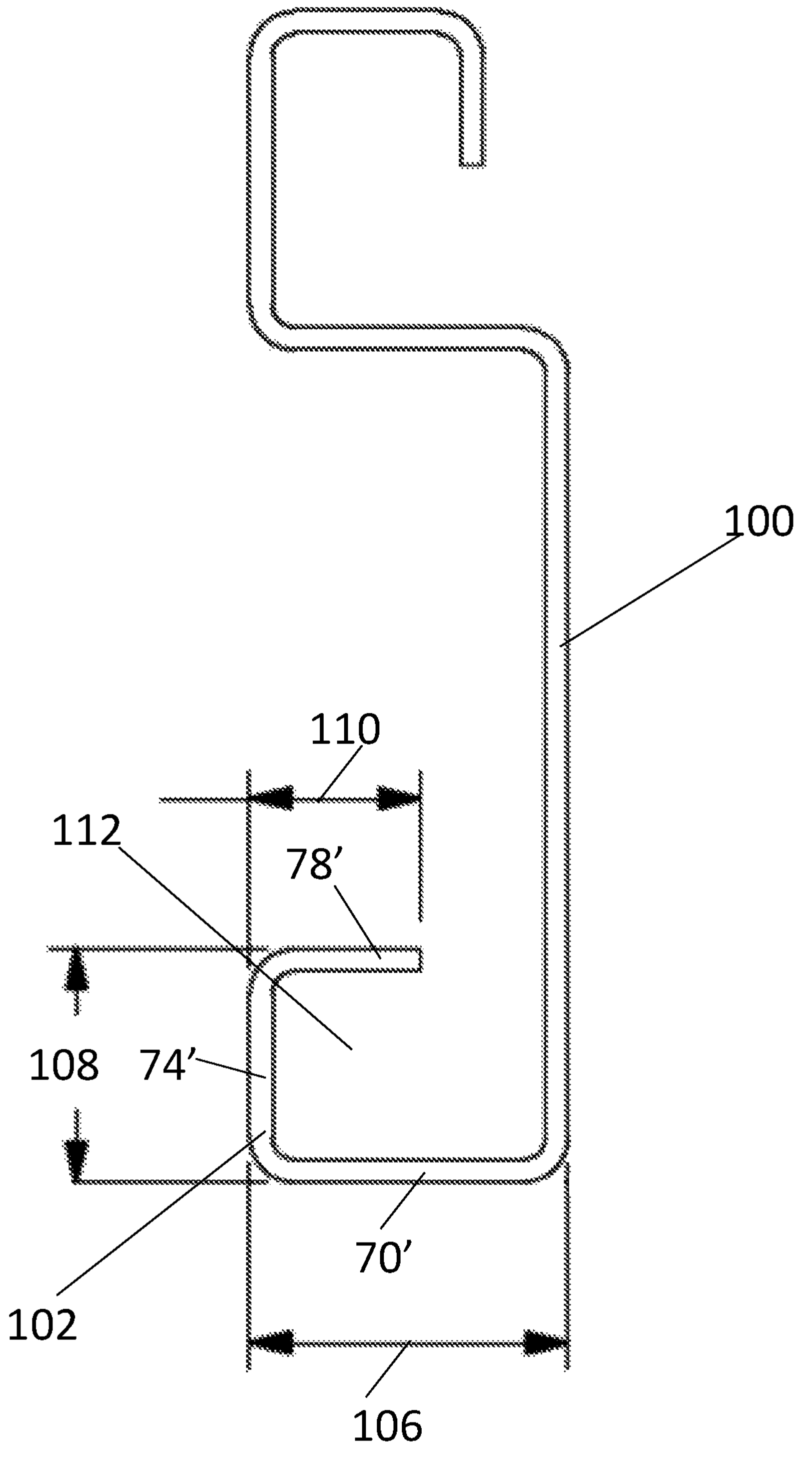
FIG. 6 is a side view of a bottom slat of the closure system of FIG. 1.
Figure 7:
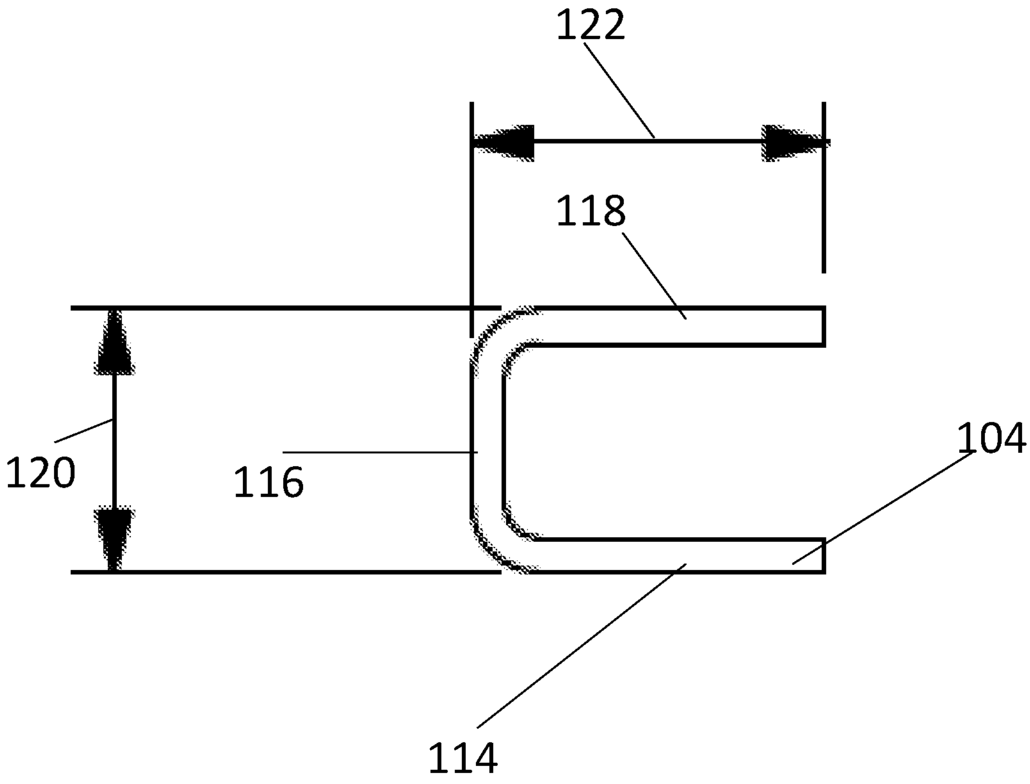
FIG. 7 is a side view of a channel member of the closure system of FIG. 1.
Figure 8:
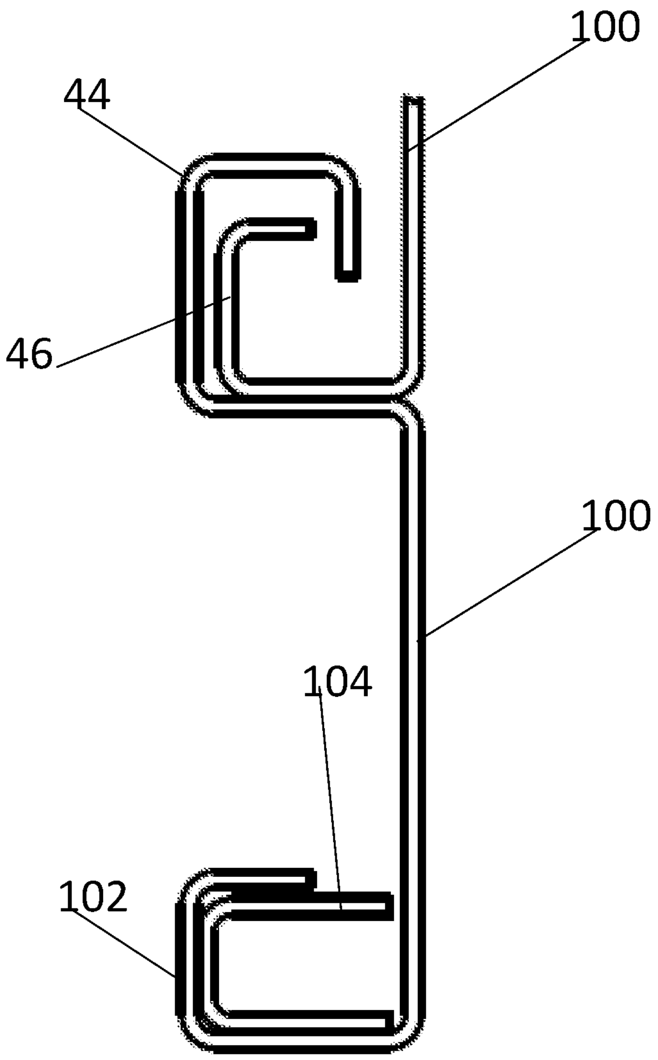
FIG. 8 is a side view of a slat interlocked with a bottom slat of the closure system of FIG. 1.

Referring to FIGS. 1 and 5, in some embodiments, the curtain 34 includes a bottom slat 100 configured to resist prying. In some embodiments, the bottom slat 100 includes major hook 44 and a minor hook 102 shaped and dimensioned to receive a channel member 104 (FIGS. 5-9). In some embodiments, the channel member 104 is configured to reinforce the minor hook 102 such that the minor hook 102 is more resistant to prying and/or deflection (e.g., an external force applied to the bottom slat 100 in an upward direction) than a slat that does not include minor hook 102 or channel member 104. In one embodiment, a slat 36 (e.g., a 4 inch high slat of 12-gauge metal) that includes a bead 38 has a moment of inertia (e.g., a second moment of area or area moment of inertia) in the X direction of about 0.285 $inches^4$. In one embodiment a bottom slat 100 (e.g., a 4 inch high slat of 12-gauge metal) that includes channel member 104 has a moment of inertia in the X direction of about 0.399 $inches^4$. In one embodiment, a slat 36 (e.g., a 4 inch high slat of 12-gauge metal) that includes a bead 38 has a moment of inertia in the Y direction of about 4.005 $inches^4$. In one embodiment a bottom slat 100 (e.g., a 4 inch high slat of 12-gauge metal) that includes channel member 104 has a moment of inertia in the Y direction of about 5.218 $inches^4$.

In some embodiments the bottom slat 100 is tensioned when it is exposed to upward prying. In some embodiments, a localized area of the bottom slat 100 is tensioned when it is exposed to upward prying because of the weight of the slats 36 bearing on adjacent portions of the bottom slat 100. In some embodiments, minor hook 102 includes minor first segment 70', minor second segment 74', and minor third segment 78' but the segments of minor hook 102 include different dimensions (e.g., length) than the segments of minor hook 46.

In some embodiments, the minor first segment 70 'of minor hook 102 has a length 106 of about 1 inch to about 2 inches, or about 1.5 inches. In some embodiments, the length of the minor first segment 70' of minor hook 102 is about 70%, about 80%, about 90%, or about 99%, of the length 82 of the major first segment 50. In some embodiments, the length of the minor first segment 70' of minor hook 102 is about 100%, about 110%, about 120%, or about 130% of the length 90 of the minor first segment 70 of minor hook 46.

In some embodiments, the minor second segment 74' of minor hook 102 has a length 108 of about 0.75 inches to about 1.25 inches, or about 1.1 inches. In some embodiments, the length 108 of minor second segment 74' of minor hook 102 is about 50% to about 90%, about 60% to about 80%, about 50%, about 60%, about 70%, about 80%, or about 90% of the length 84 of major second segment 56. In some embodiments, the length 108 of the minor second segment 74' of minor hook 102 is about 80% to about 120%, about 90% to about 110%, about 80%, about 90%, about 100%, about 110%, or about 120% of the length 92 of the minor second segment 74 of minor hook 46.

In some embodiments, the minor third segment 78' of minor hook 102 has a length 110 of about 0.5 inches to about 1.5 inches, or about 0.8 inches. In some embodiments, the length 110 of minor third segment 78' of minor hook 102 is about 55% to about 95%, about 65% to about 85%, about 55%, about 65%, about 75%, about 85%, or about 95% of the length 86 of major third segment 60. In some embodiments, the length 110 of minor third segment 78' of minor hook 102 is about 110% to about 170%, about 120% to about 160%, about 130% to about 150%, about 110%, about 120%, about 130%, about 140%, about 150%, about 160%, or about 170% of the length 94 of minor third segment 78 of minor hook 46.

In some embodiments, the channel member 104 (FIG. 7) is shaped and dimensioned to nest within a cavity 112 in minor hook 102 of bottom slat 100 (or slat 36). In some embodiments, the channel member 104 is manufactured from the same material as the bottom slat 100. In other embodiments, the channel member 104 is manufactured from polymer, metal, wood, or plastic. In some embodiments, the channel member 104 is disposed within the minor hook 102 of the bottom slat 100 and the channel member 104 reinforces (e.g., stiffens) the minor minor hook 102. In some embodiments, the channel member 104 includes a first segment 114, a second segment, 116, and a third segment 118. In some embodiments, the channel member 104 extends substantially across width of the bottom slat 100 between the guide assembly 102 members. In some embodiments, the channel member 104 includes a plurality of channel members 104 spaced from each other within the cavity 112 along the length of the minor hook 102.

In some embodiments, a length 122 of the first segment 114 and third segment 118 are within about 80% to about 120%, about 90% to about 110%, about 80%, about 90%, about 100%, about 110%, or about 120% of each other. In some embodiments, the length 122 of first segment 114 is about 55% to about 95%, about 65% to about 85%, about 55%, about 65%, about 75%, about 85%, or about 95% of the length 106 of minor first segment 70 of minor hook 102 of bottom slat 100. In some embodiments, the length 122 of first segment 114 is about 0.5 inches to about 1.5 inches, or about 1.1 inches.

In some embodiments, the second segment 116 has a length 120 that is about 55% to about 95%, about 65% to about 85%, about 55%, about 65%, about 75%, about 85%, or about 95% of the length 108 of minor second segment 74 of minor hook 102. In some embodiments, the second segment 116 has a length 120 that is about 0.5 inches to about 1.0 inches, or about 0.8 inches.

Figure 13:
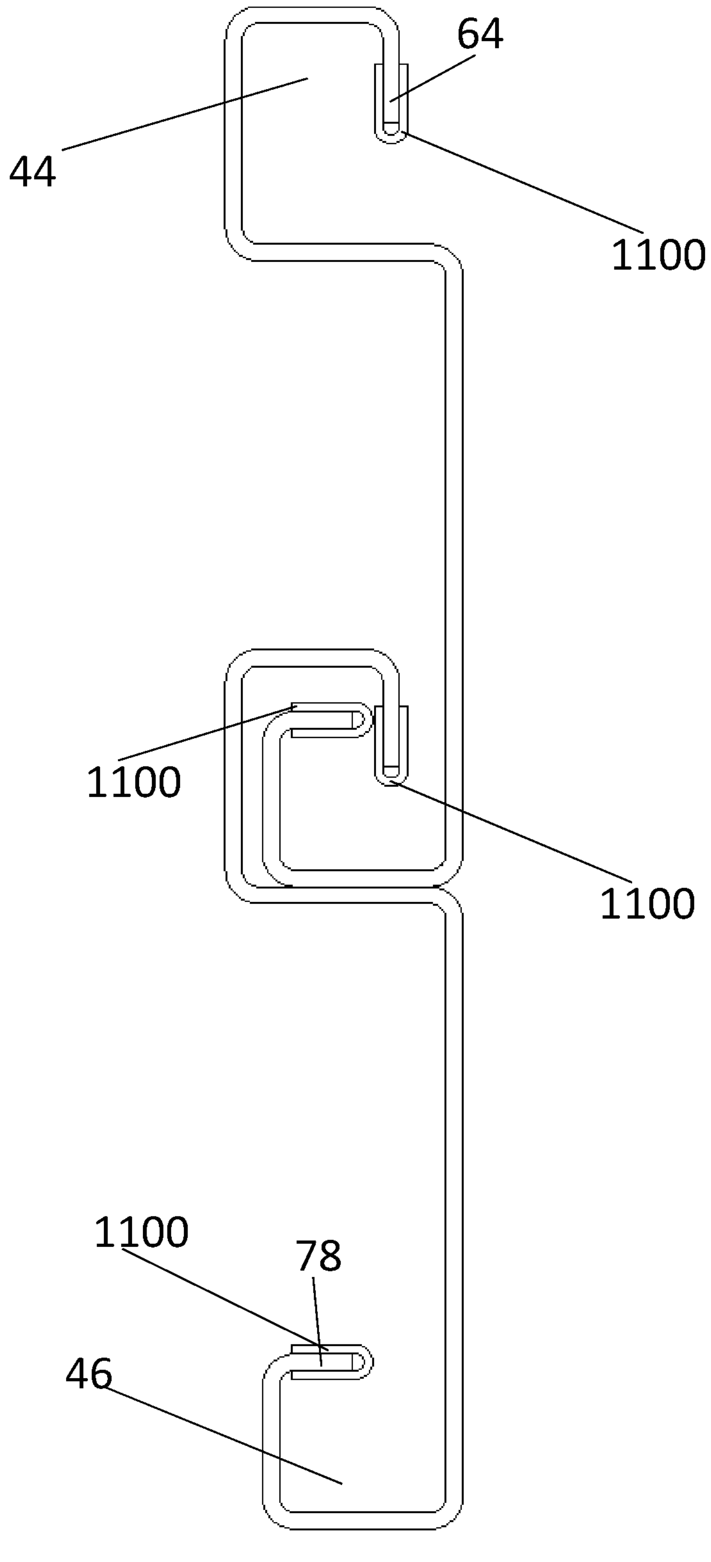
FIG. 13 is a side view of a slat with a damper of the closure system of FIG. 1.

In some embodiments, the closure includes one or more dampers 1100 to reduce the sliding friction and/or wear between adjacent slats (e.g., friction when there is contact during relative articulation between the slats). One embodiment of a damper 1100 is shown in FIG. 13. In some embodiments, the dampers 1100 reduce noise during coiling of the curtain 34. In some embodiments, the damper 1100 is a polymer extrusion. In some embodiments, the damper 1100 is a coating or tape that is applied to a portion of major hook 44 or minor hook 46. In other embodiments, the channel member 104 is manufactured from metal, wood, rubber, or plastic. In some embodiments, damper 1100 is coupled to a terminal end one or more of major hook 44 and minor hook 46. In some embodiments, damper 1100 wraps around a terminal end of minor third segment 78 of minor hook 46 and major fourth segment 64 of major hook 44. In some embodiments, the damper 1100 is configured to reduce the noise produced by the closure system 30 as the curtain 34 is moved between the open and closed position. In some embodiments, a curtain with damper 1100 produces a sound while moving from the extended position to the retracted position that is about 1 dB, about 5 dB, about 10 dB, about 15 dB, or about 20 dB less than a curtain without a damper. In some embodiments, a curtain with damper 1100 is about 5%, about 10%, about 15%, or about 20% quieter than a curtain without damper 1100. In some embodiments, a curtain with damper 1100 produces a sound level of about 70 dB while operating and a curtain without damper 1100 produces a sound level of about 80 dB while operating.

Figure 14:
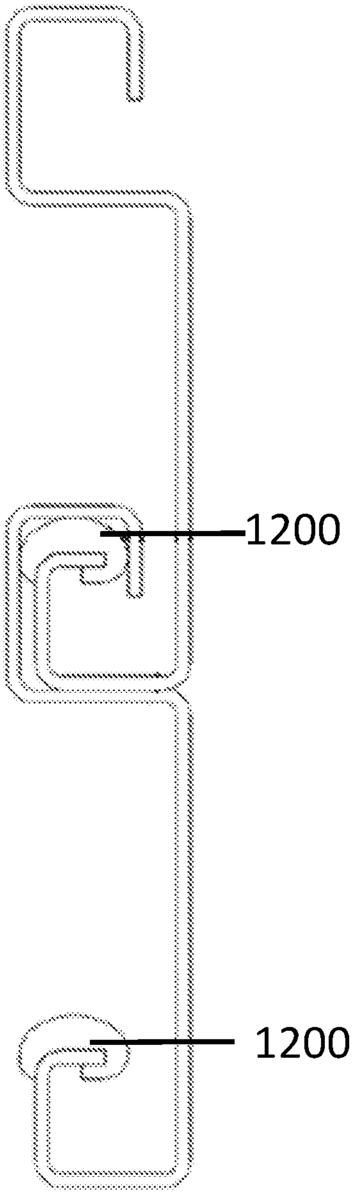
FIG. 14 is a side view of a slat of the closure system of FIG. 1 with a damper in accordance with another exemplary embodiment of the present invention.

Another embodiment of a damper 1200 is shown in FIG. 14. In some embodiments, the damper 1200 may be positioned relative to (e.g., disposed between) adjacent slats to enhance a snug-tight fit between slats and rotation around the barrel or axle. In one embodiment, the damper 1200 is positioned in the bead, between the major hook 44 and the minor hook 46. In one embodiment, closure system 30 includes a damper 1200 that engages a portion of major hook 44 and a portion of minor hook 46. In one embodiment, the damper engages the major second segment 56, major third segment 60 and major fourth segment 34 of major hook 44 along with minor second segment 74 and minor third segment 78. Damper 1200 may further be configured to wrap around at least a portion of minor third segment 78.

Figure 10:
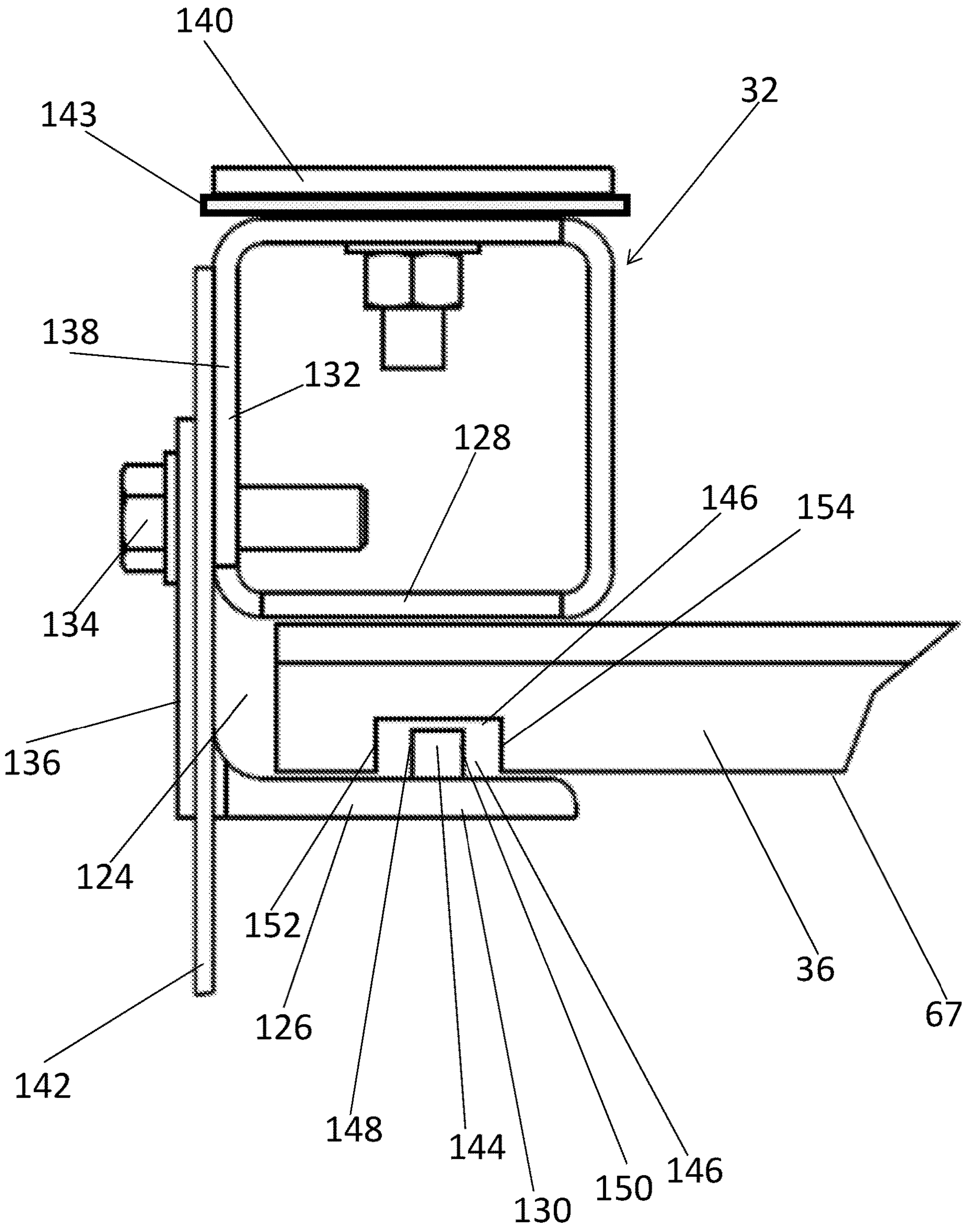
FIG. 10 is a top view of an end of a slat within a guide of the closure system of FIG. 1.
Figure 15:
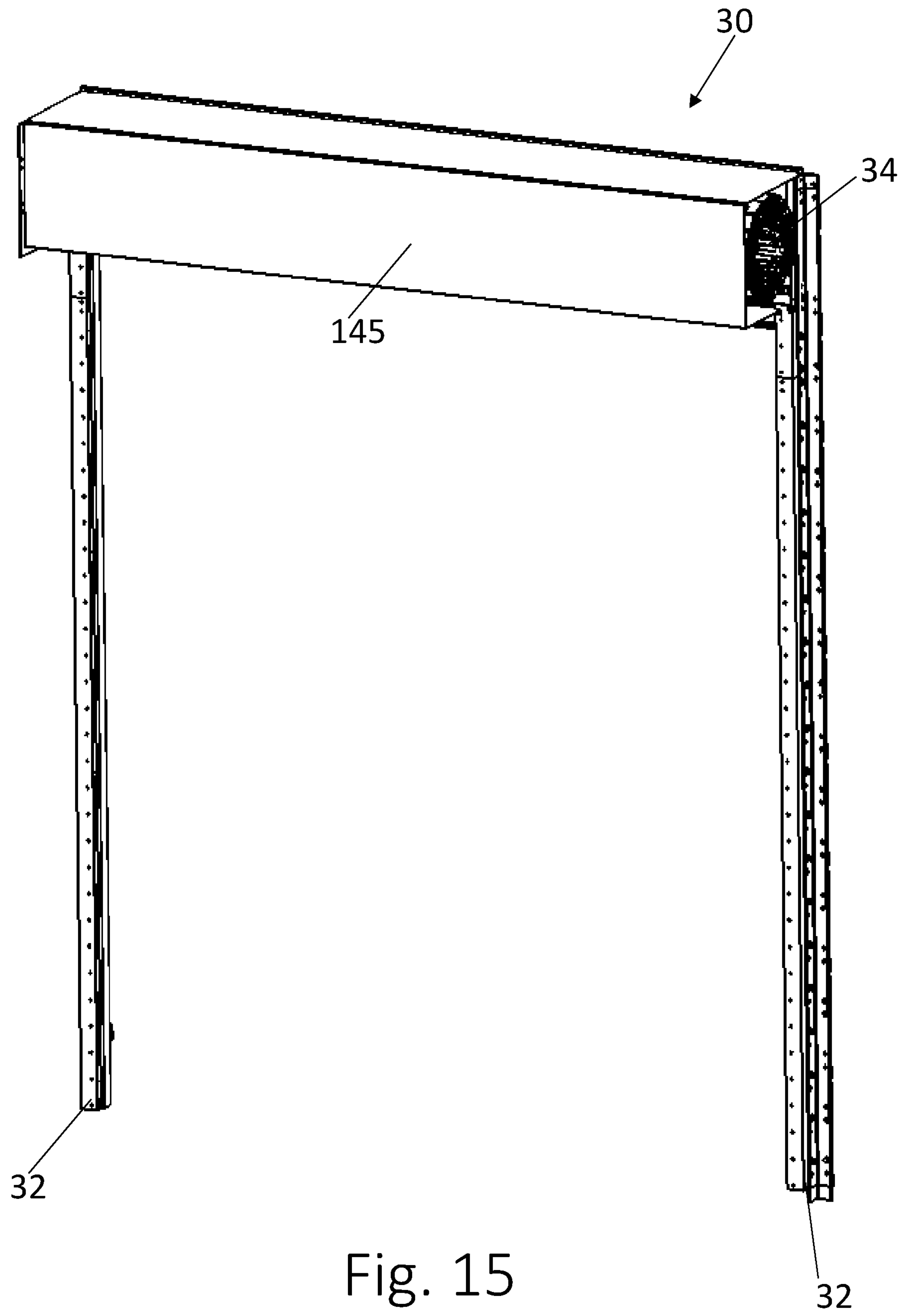
FIG. 15 is a front perspective view of the closure system of FIG. 1 with the curtain in an open position.

Referring to FIG. 10, in some embodiments, the guide assembly 32 includes a channel 124 defined by a first guide wall 126 and a second guide wall 128. In some embodiments, the channel 124 is configured to moveably receive or retain a portion of the curtain 34 as the curtain 34 moves between the open and closed position. In some embodiments, the guide assembly 32 includes a first guide component 130 and a second guide component 132. In some embodiments, the first guide component 130 includes the first guide wall 126 and a first web 136. In some embodiments, the first guide wall 126 is perpendicular to the first web 136. In some embodiments, the second guide component 132 includes the second guide wall 128 and a second web 138. In some embodiments, the second guide wall 128 and the second web 138 are perpendicular to each other. In some embodiments, the second guide component 132 is steel tubing. In some embodiments, the first guide component 130 is a metal angle (e.g., a steel angle, angle iron). In some embodiments, the first guide component 130 and second guide component 132 are coupled together with an anchor 134 (e.g., nut and bolt, weld, adhesive, or rivet). In some embodiments, the first web 136 is coupled to the second web 138 to form the guide channel 124. In some embodiments, the guide assembly 32 includes a plate 140 that may be fixed (e.g., by welding, adhesive, or fastener) to a structure and then coupled to second guide component 132. The plate 140 may be coupled to a head plate (e.g., a bracket supporting the curtain) above the guide assembly 32. In some embodiments, a shim 142 may be coupled between a structure and the guide assembly 32 to allow the guide assembly 32 to accommodate irregular surfaces (e.g., uneven or non-plumb surfaces). In some embodiments, the guide assembly 32 may be coupled to head plate 143 which may be part of a head space enclosure 145 (FIG. 15). In some embodiments, the channel 124 includes a channel width as measured between the first guide wall 126 and the second guide wall 128. In some embodiments, the slat 36 includes a slat width from a face 67 of the major hook 44 to the face 158 of the body 48 and the channel width is about 0.125 inches, about 0.25 inches, about 0.5 inches, about 1 inch, about 1.5 inches, about 2 inches, about 2.5 inches, or about 3 inches larger than the slat width. In some embodiments, the channel width is about 100%, about 110%, about 125%, about 150%, about 175%, or about 200% of the slat width.

Figure 9:
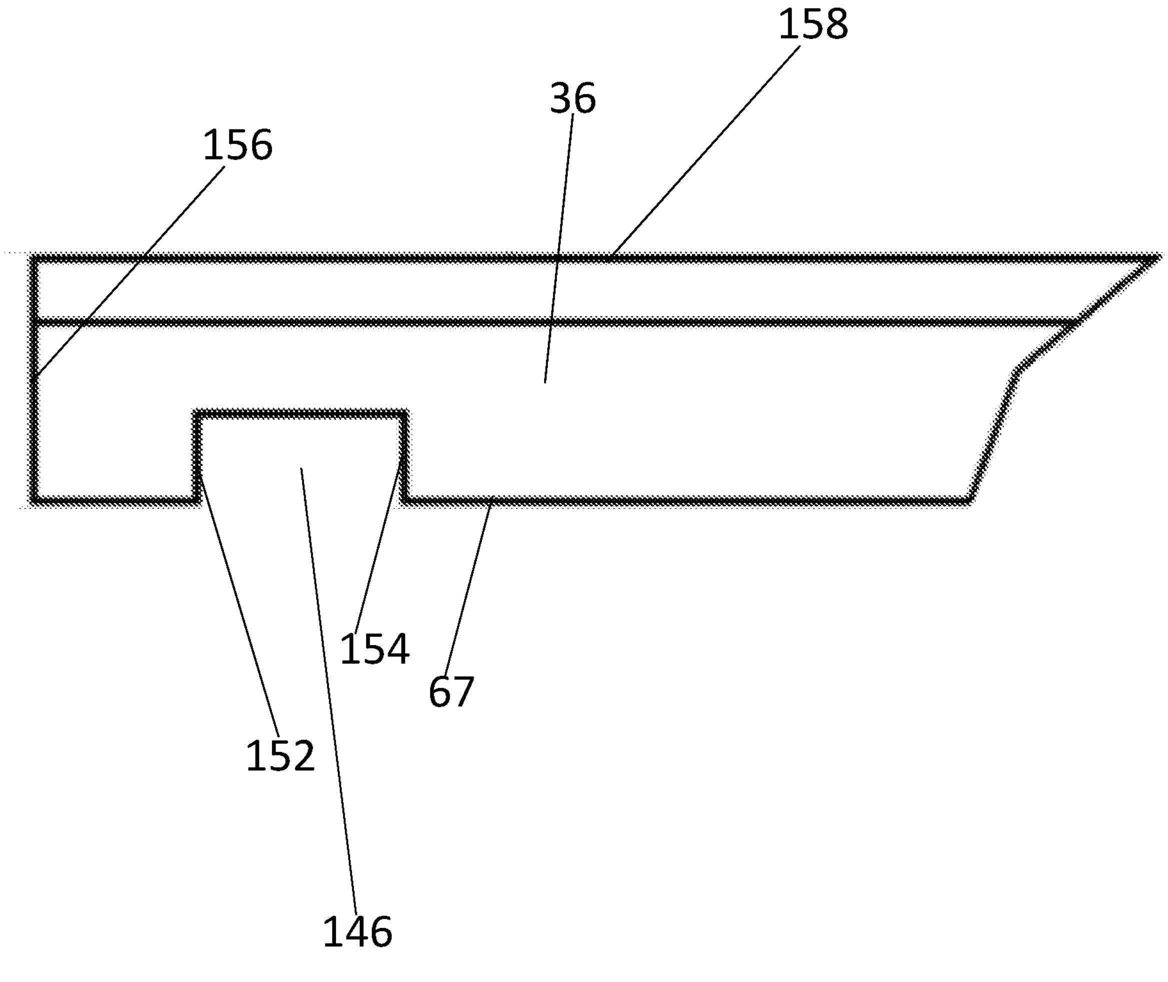
FIG. 9 is a top view of an end of a slat of the closure system of FIG. 1.

Referring to FIG. 9, in some embodiments, slat 36 includes a retention groove 146 configured and dimensioned to engage a retention bar 144 to retain the slat 36 within a channel 124, as explained in greater detail below. In some embodiments, the retention groove 146 includes at least one sidewall (e.g., 152, 154) configured and dimensioned to engage the retention bar 144. In some embodiments, the retention groove 146 includes a first groove sidewall 152 and a second groove sidewall 154, each configured and dimensioned to engage the retention bar to retain the slat 35 within the channel 124. In some embodiments, the first groove sidewall 152 and the second groove sidewall 154 are perpendicular to an outermost face 67 of the slat 36. In some embodiments, the first groove sidewall 152 or second groove sidewall 154 extend into the slat 36 from the outermost face 67 at a distance that is about one quarter, one third, one half, two thirds, or three quarters of the major slat width. In some embodiments, the retention groove 146 extends into (e.g., from the outermost face 67) a portion of at least one of the major hook 44 and the minor hook 46. In some embodiments, the retention groove 146 does not extend into the body 48 of the slat 36. In some embodiments, the retention groove 146 is disposed within the slat body 48.

In some embodiments, the retention groove 146 includes a groove width as measured between the first groove sidewall 152 and the second groove sidewall 154 (e.g., along a longitudinal axis of the slat). In some embodiments, the slat 36 includes a terminal end 156 and the retention groove 146 is positioned at a distance from the terminal end 156 of at least about 0.4, 0.6, 0.8, 1, 1.5, 2, 2.5, or 3 times the groove width. In some embodiments, the distance from the retention groove 146 to the terminal end 156 of the slat 36 is selected to complement the strength of the retention bar. In some embodiments, the retention groove 146 extends from the face 67 of at least one of the major hook 44 and the minor hook 46 toward the face 158 of the body 48 to a depth that is less than the length 94 of the minor third segment 70.

Referring to FIG. 10, in some embodiments, at least one of the first guide wall 126 and the second guide wall 128 include a retention bar 144 configured to engage a retention groove 146 on the curtain 34, as explained in greater detail below. In some embodiments, the retention bar 144 extends from the first guide wall 126 and into the channel 124. In some embodiments, the retention bar 144 includes a first bar sidewall 148 and a second bar sidewall 150. In some embodiments, one of the first groove sidewall 152 and the second groove sidewall 154 are configured to engage one of the first bar sidewall 148 and the second bar sidewall 150 such that a portion of the slat 36 stays within the channel 124. In some embodiments, at least one of the first bar sidewall 148 and the second bar sidewall 150 are perpendicular to the first guide wall 126. In some embodiments, at least one of the first bar sidewall 148 and the second bar sidewall 150 are obtuse to the first guide wall 126. In some embodiments, the retention bar 144 has a bar width as measured between the first bar sidewall 148 and the second bar sidewall 150 (e.g., along a longitudinal axis of slat 36) and the ratio of the groove width to bar width is about 1.1:1, about 2:1, about 2.5:1, or about 5:1. In some embodiments, the groove sidewall does not engage the bar sidewall until the slat 36 is deflected in a direction transverse to longitudinal axis of the slat by a deflection distance of about 5 inches, about 6 inches, about 7 inches, about 8 inches, about 9 inches, or about 10 inches. In some embodiments, the nominal distance between the first bar sidewall 148 and the first groove sidewall 152 is selected based on the amount of deflection that is permitted for the slat. In some embodiments, the amount of deflection at the midpoint of the slat is determined by the equation Deflection=0.866*sqrt(slip)*sqrt(L) where (slip) is the nominal distance between the first bar sidewall 148 and the first groove sidewall 152 and (L) is the length of the slat. In some embodiments, slip is about 0.375 inches for a 14 foot wide door and there is 7 inches of deflection. A curtain 34 having the features described herein may require a greater force to achieve 7 inches of deflection than existing curtain designs. In some embodiments, a friction force between the retention bar sidewall and the retention groove sidewall at least partially prevent the curtain 34 from moving between the closed and open position when the bar sidewall engages the groove sidewall. In some embodiments, the retention bar 144 within the retention groove 146 maintains relative positioning of the slats relative to one another.

In some embodiments, the major hook 44 includes a major width defined by an outermost face 67 of a vertical segment and an innermost face 69 of a major fourth segment 64 (FIG. 3) and the retention bar 144 extends across at least 10%, at least 15%, at least 20%, at least 25%, at least 30%, at least 35%, at least 40%, at least 45%, or at least 50% of the major width when the slat 36 is within the channel 124. In some embodiments, the slats 36 are moveable within the channel 124 relative to the retention bar 144 in a direction transverse to a longitudinal axis of retention bar 144 such that the retention bar extends across at least 25% of the slat width and no more than 40% of the slat width.

Figure 11:
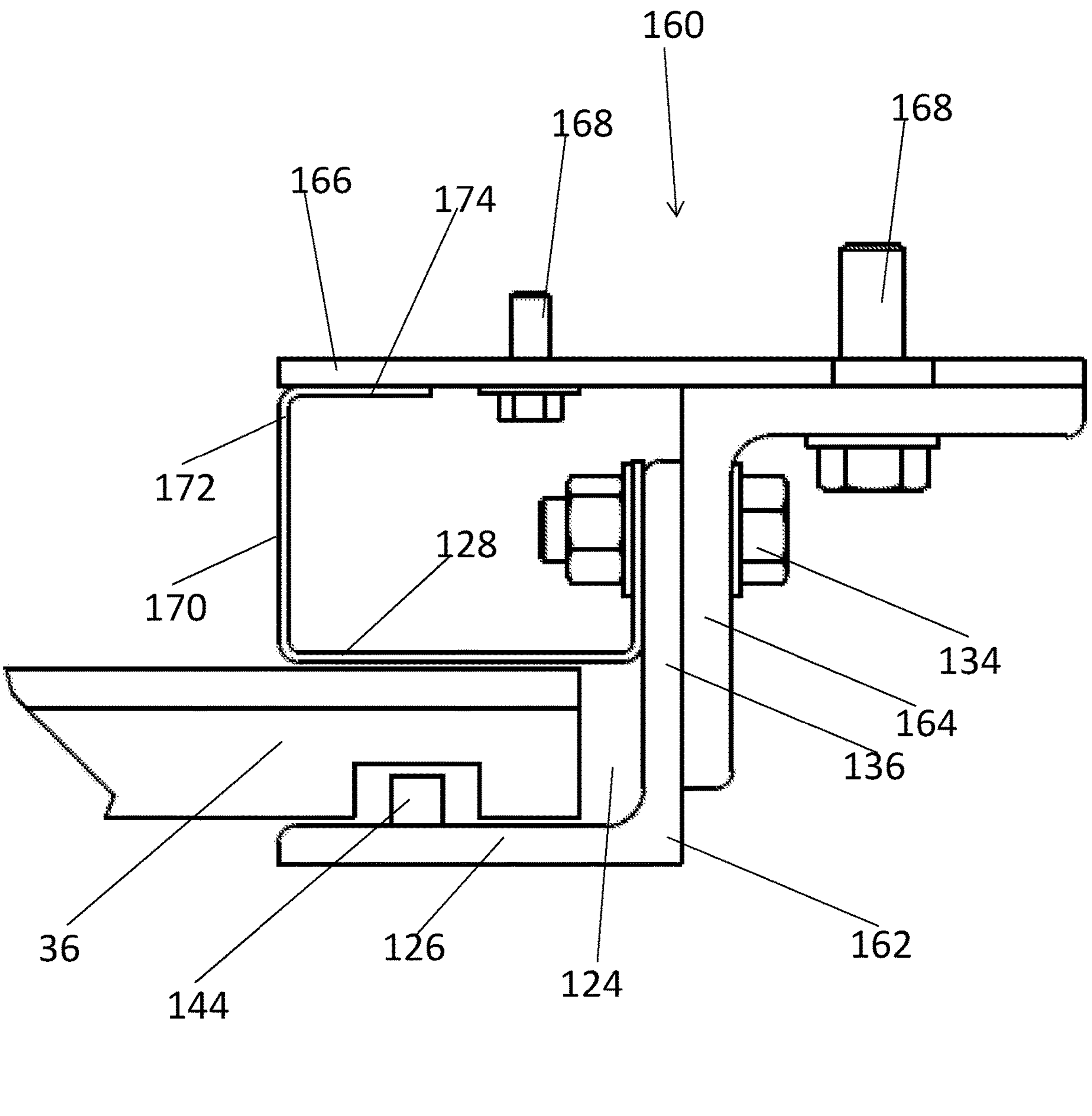
FIG. 11 is a top view of an end of a slat of the closure system of FIG. 1 within a guide in accordance with another exemplary embodiment of the present invention.
Figure 12:
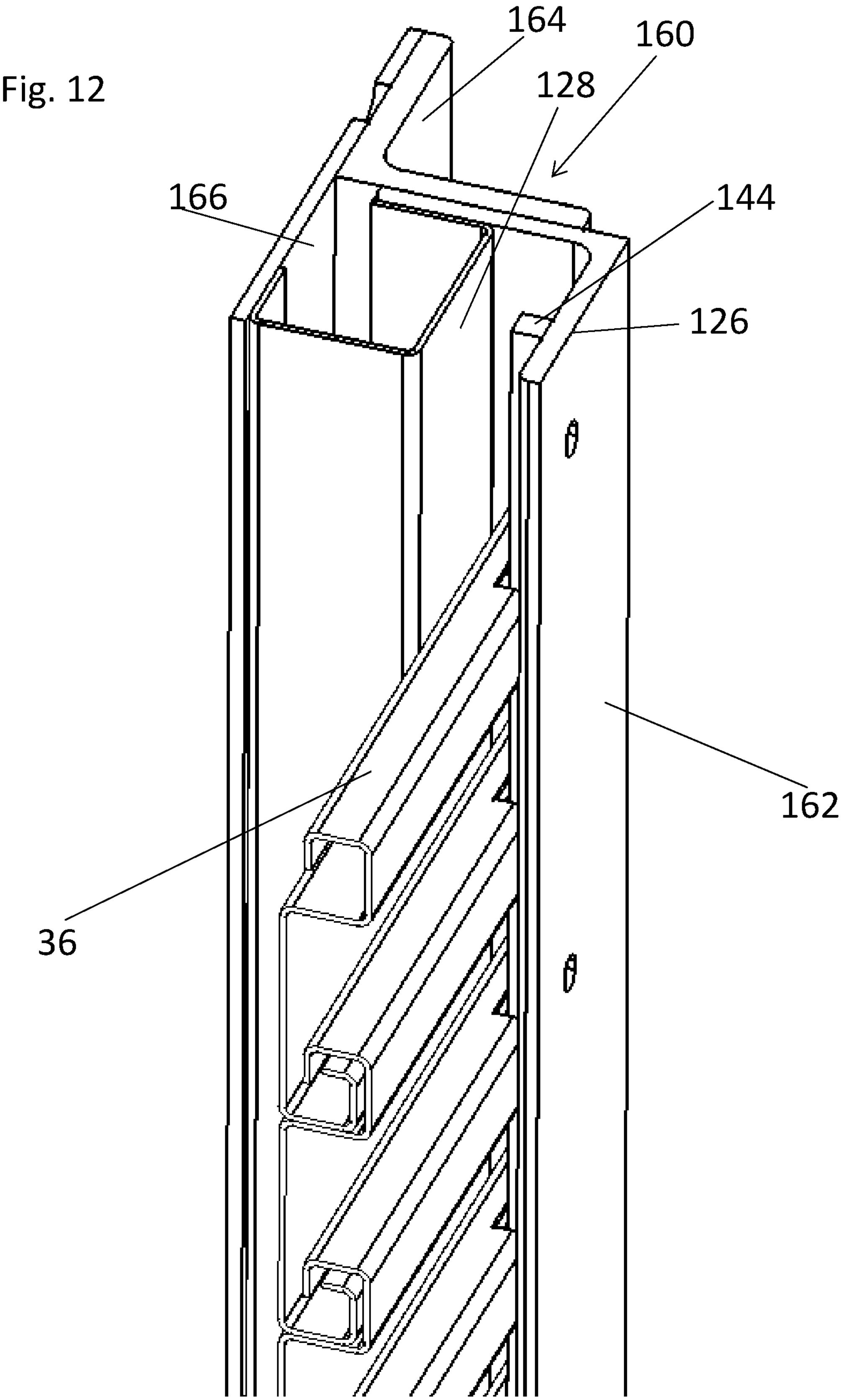
FIG. 12 is top perspective view of the slat of the closure system of FIG. 1 within the guide of FIG. 12.

Referring to FIGS. 11-12, there is shown an embodiment of a guide assembly 160. In some embodiments, the guide assembly 160 includes a first guide component 162 and a second guide component 164. In some embodiments, each of the first guide component 162 and the second guide component 164 are a metal angle (e.g., a steel angle, angle iron). In some embodiments, the first guide component 162 and the second guide component 164 are each an L shaped bracket and the guide components are joined together such that their longitudinal axes are parallel with the second guide component 164 rotated about its longitudinal axis 180 degrees relative to the first guide component 162. In some embodiments, the first guide component 162 and the second guide component 164 are coupled to each other by anchor 134.

In some embodiments, the guide assembly 160 includes a substrate engagement member 166 configured to engage a substrate (e.g., a wall, an edge of the opening, or a support column). In some embodiments, the substrate engagement member 166 is coupled to the second guide component 164. In some embodiments, the substrate engagement member 166 is a plate (e.g., a steel plate) and is coupled to the substrate with anchors 168 (e.g., nut and bolt, rivet, or a weld).

In some embodiments, the first guide component 162 includes the first guide wall 126 and the first web 136. In some embodiments, the second guide wall 128 is coupled to the first guide component 162 and the substrate engaging member 166. In some embodiments, a partition 170 includes the second guide wall 128. In some embodiments, the partition 170 includes the second guide wall 128 and a second wall 172. In some embodiments, the second wall 172 is transverse to the second guide wall 128. In some embodiments, the second wall 172 is perpendicular to the second guide wall 128. In some embodiments, the partition 170 includes a third wall 174. In some embodiments, the third wall 174 is parallel to the second guide wall 128. In some embodiments, the third wall 174 is perpendicular to the second wall 170. In some embodiments, the second wall 172 is coplanar with an end of one or more of the substrate engaging member 166 and the first guide wall 126. In some embodiments, guide assembly 32 is coupled to a first edge of an opening and guide assembly 160 is coupled to a second edge of the opening.

Some existing coiling doors include a locking device to secure the bottom bar to a guide or wall. In some embodiments, the closure system 30 includes a means for applying a compression force at a top or midpoint of the closure system 30 (e.g., at the top slat 36 or one of the slats between the top slat and the bottom slat) that translates to the bottom slat 100. For example, in embodiments where adjoining slats are loadbearing slats (such as, for example, embodiments described above), downward pressure applied to an upper slat translates from slat to adjacent slat thereby urging the curtain downward and urging each slat into compression against an adjacent slat. In some embodiments, the design of the major hook 44 and minor hook 46 allow the slats 36 to sit on an adjacent slat 36 thereby applying a cumulative compression load to the bottom slat 100.

Existing closure systems may include a rounded bead such that the slats tend to rotate inside the channel when the bottom slat is lifted even when the mounting shaft is not rotated. In some embodiments, the ratio of the guide channel width to the slat width is selected to prevent folding (e.g., accordion style folding) of the slats relative to each other to maintain the full height of the curtain 34 in the closed position even when an upward prying force is applied to the bottom slat 100. Such a configuration enhances resistance to prying the closure (and the bottom bar) upward. In some embodiments, there is compression means for applying compression (e.g., downward force against a curtain) force to a first slat for propagation of the force to the bottom bar. In one embodiment, the compression means is a motor coupled to a coiling shaft that applies a compression force by rotating the coiling shaft such that a force propagates through the slats to the bottom bar. In other embodiments, the compression means is a biasing element (e.g., a spring).

In some embodiments, the closure system 30 is configured to permanently deform a maximum of five inches, four inches, three inches, two inches, or one inch in a direction substantially normal to an inner most surface of the curtain 34 when a fifteen pound two by four at a speed of about 100 miles per hour impacts the closure system 30. In some embodiments, the closure system 30 is configured to withstand perforation when the two by four impacts the closure system 30 at a speed of 100 miles per hour as performed in accordance with ICC 500-2014. In some embodiments, the closure system is configured to have a maximum perforation of 5 inches by 1/16 inches when the two by four impacts the closure system 30 at a speed of 80 feet per second as performed in accordance with ASTM E1996-14. In some embodiments, the closure system 30 is configured to withstand positive or negative pressure of 300 pounds per square foot on one side of the closure system in accordance with ICC 500-2014. In some embodiments, the closure system 30 is operable after being exposed to positive or negative pressure of 300 pounds per square foot on one side of the closure system in accordance with ICC 500-2014. In some embodiments, the closure system 30 is configured to withstand positive or negative pressure of 90 pounds per square foot on one side of the closure system 30. In some embodiments, the closure system 30 is configured to withstand positive or negative pressure of about 5 pounds per square foot on one side of the closure system 30. In some embodiments, the closure system 30 is configured to comply with at least one of FEMA P-361, Third edition; ICC 500-2014, ASTM E330-14, ASTM E1886-13, ASTM E1996-17, TAS 201-94, TAS 202-94, TAS 203-94, ANSI/DASMA 108-2012, and ANSI/DASMA 115-2005.

In some embodiments, the closure system 30 is fire rated (e.g., when a first side of the closure is exposed to an elevated temperature, a second side of the closure remains within a selected temperature deviation range for a selected time period). In some embodiments, when a first side of the curtain is exposed to fire for 5 minutes, 10 minutes, 20 minutes, 30 minutes, 45 minutes, 1 hour, 1.5 hours, 2 hours, 3 hours, or 4 hours, a second side of the door that is not exposed to the fire shall not exceed 1,000° F., 1,300° F., 1,462° F., 1,550° F., 1,638° F., 1,700° F., 1,792° F., 1,850° F., 1,925° F., 2,0000° F., respectively, in accordance with the time-temperature curve of underwriter's laboratories standard UL 10B. In some embodiments, the closure system mitigates or prevents the passage of smoke, heat, fire, or toxic gases for a selected time period (e.g., 5 minutes, 10 minutes, 20 minutes, 30 minutes, 45 minutes, 1 hour, 1.5 hours, 2 hours, 3 hours, or 4 hours).

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A closure system comprising:

a guide assembly having a channel defined by a first guide wall and a second guide wall; and a retention bar extending into the channel from the first guide wall;

a plurality of slats, each slat of the plurality of slats configured to interlock with another of the plurality of slats to form a curtain comprising a plurality of beads, each slat having a retention groove with at least one sidewall configured and dimensioned to engage the retention bar to retain each slat within the channel; and a bottom slat that is configured to resist prying, at least a portion of the bottom slat tensioned when exposed to upward prying, wherein the closure system is configured to move in a first direction between a retracted position and an extended position and the bottom slat bears a weight of a majority of the plurality of slats when the closure system is in the extended position and a force is applied to the bottom slat in a second direction opposite the first direction, wherein each slat of the plurality of slats includes a minor hook, a major hook, and a body disposed between the major hook and the minor hook, the minor hook configured and dimensioned to be disposed within the major hook of an adjoining slat in a disengaged position and engages the major hook of the adjoining slat when the closure system is moving, and the minor hook is to deform within the major hook prior to a deformation of the body when the body is impacted by a two inch by four inch piece of lumber, wherein the major hook comprises a single major rectangular hook and the minor hook comprises a single minor rectangular hook that are each configured and dimensioned such that, in use, the single minor rectangular hook of each slat is disposed within the single major rectangular hook of the adjoining slat to form each bead of the plurality of beads of the curtain, wherein the single major rectangular hook comprises:

a major first segment disposed substantially perpendicular to the body;

a major second segment that is substantially perpendicular to the major first segment and parallel to the body, wherein the major second segment forms an outermost face of a respective bead that is extended away from the body of the slat;

a major third segment that is perpendicular to the major second segment and parallel to the major first segment; and a major fourth segment that is perpendicular to the major third segment and parallel to the major second segment.

2. The closure system of claim 1, wherein the at least one sidewall includes a first sidewall and a second sidewall, each of the first sidewall and the second sidewall configured and dimensioned to engage the retention bar to retain each slat within the channel.

3. The closure system of claim 1, each bead of the plurality of beads comprising:

the outermost face and each slat having a major slat width from an innermost face of the slat to the outermost face of the bead;

wherein the at least one sidewall is substantially perpendicular to the outermost face of the slat, the at least one sidewall extending into the slat from the outermost face of the slat a distance that is one-third of the major slat width.

4. The closure system of claim 3, wherein all of the plurality of slats interlock at one or more of the plurality of beads.

5. The closure system of claim 1, wherein the guide assembly comprises:

a first guide component that includes the first guide wall and a first web; and a second guide component that includes the second guide wall and a second web;

wherein the first web and the second web are coupled to form the channel.

6. The closure system of claim 1, wherein the retention bar has a bar width measured along a longitudinal axis of each slat and the retention groove has a groove width measured along the longitudinal axis of each slat and wherein a ratio of the groove width to the bar width is about 2.5:1.

7. The closure system of claim 1, wherein the retention groove has a groove width measured along a longitudinal axis of each slat and the retention groove is positioned at a distance from a terminal end of each slat of at least about 0.8 times the groove width.

8. The closure system of claim 1, wherein each of the plurality of slats are joined together in a rectangular interlocking grip.

9. The closure system of claim 1, wherein at least one of the plurality of slats has a moment of inertia in a first direction of at least 0.1 inches.

10. The closure system of claim 1, wherein the body is disposed lower than a lowest portion of the single major rectangular hook when the closure system is in the extended position.

11. The closure system of claim 1, wherein, the single minor rectangular hook comprises a minor first segment substantially perpendicular to the body, and the minor first segment of a first slat bears against the major first segment of the adjoining slat when the closure system is in the extended position.

12. The closure system of claim 11, wherein, in a closed position, each pair of adjoining slats comprises an upper slat that bears upon a lower slat.

13. The closure system of claim 1, further comprising:

a damper coupled to at least one major rectangular hook or minor rectangular hook.

14. The closure system of claim 1 wherein the single minor rectangular hook further comprises:

a minor first segment having a longitudinal axis that is substantially perpendicular to the longitudinal axis of the body;

a minor second segment adjacent the minor first segment, the minor second segment having a longitudinal axis that is substantially parallel to the longitudinal axis of the body; and a minor third segment adjacent the minor second segment, the minor third segment having a longitudinal axis that is substantially parallel to the longitudinal axis of the minor first segment;

wherein, when the closure system is in a closed position the single minor rectangular hook of a first slat nests in the single major rectangular hook of the adjoining slat such that the major first segment is adjacent the minor first segment, the major second segment is adjacent the minor second segment and the major third segment is adjacent the minor third segment.

15. The closure system of claim 1, wherein the retention groove extends into a portion of at least one of: the single major rectangular hook or the single minor rectangular hook of each of the plurality of slats.

16. The closure system of claim 15, wherein the single major rectangular hook comprises a major width defined by the outermost face of an outward vertical segment and an innermost face of a terminal vertical segment and, when the plurality of slats are within the channel, the retention bar extends across at least 25% of the major width.

17. The closure system of claim 16, wherein each of the plurality of slats is moveable relative to the retention bar in a direction transverse to a longitudinal axis of the retention bar such that the retention bar extends across at least 25% of the major width and no more than 55% of the major width.

18. The closure system of claim 1, wherein each of the plurality of slats has a slat width X extending from a back face of the body to a front face of the single major rectangular hook; and the first guide wall and the second guide wall are separated by a distance Y;

wherein X is approximately 1.04 to 1.3 times greater than Y.

19. The closure system of claim 1 further comprising applying a compression force at a top of the closure system that translates to the bottom slat.

20. The closure system of claim 1, wherein the closure system is configured to permanently deform a maximum of three inches in a direction substantially normal to an innermost surface when a fifteen pound two inch by four inch piece of lumber at a speed of 100 miles per hour impacts the closure system.

21. The closure system of claim 20, wherein the closure system is configured to withstand perforation when the two inch by four inch piece of lumber impacts the closure system at a speed of 100 miles per hour as performed in accordance with ICC 500-2014.

22. The closure system of claim 20, wherein the closure system is configured to have a maximum perforation of 5 inches by 1/16 inches when the two inch by four inch piece of lumber impacts the closure system at a speed of 80 feet per second as performed in accordance with ASTM E1996-14.

23. The closure system of claim 1, wherein the closure system is configured to withstand positive or negative pressure of 300 pounds per square foot on one side of the closure system.

24. The closure system of claim 1, wherein the closure system is configured to withstand positive or negative pressure of 90 pounds per square foot on one side of the closure system.

25. The closure system of claim 1, wherein the closure system is configured to withstand positive or negative pressure of at least 5 pounds per square foot on one side of the closure system.

26. The closure system of claim 1, further comprising:

a bottom bar coupled to the bottom slat, the bottom bar including a channel member nested within a minor rectangular hook of the bottom slat.

27. The closure system of claim 1, wherein the closure system is configured to comply with at least one of: FEMA P-36 Third edition, ICC 500-2014, ASTM E330-14, ASTM E1886-13, ASTM E1996-17, TAS 201-94, TAS 202-94, TAS 203-94, ANSI/DASMA 108-2012, or ANSI/DASMA 115-2005.

28. The closure system of claim 1, wherein the major hook and the minor hook of each of the plurality of slats are configured to deform before the body deforms when the body is impacted by the two inch by four inch piece of lumber.

29. The closure system of claim 1, wherein the plurality of slats are configured to reduce curtain deformation from a load.

30. The closure system of claim 1, wherein a center of mass of each slat of the plurality of slats is closer to the outermost face than an innermost face formed by the body.

* * * * *